US007962695B2

(12) United States Patent
Faucher et al.

(10) Patent No.: US 7,962,695 B2
(45) Date of Patent: Jun. 14, 2011

(54) METHOD AND SYSTEM FOR INTEGRATING SRAM AND DRAM ARCHITECTURE IN SET ASSOCIATIVE CACHE

(75) Inventors: Marc R. Faucher, South Burlington, VT (US); Hillery C. Hunter, Somers, NY (US); William R. Reohr, Ridgefield, CT (US); Peter A. Sandon, Essex Junction, VT (US); Vijayalakshmi Srinivasan, New York, NY (US); Arnold S. Tran, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 11/949,935

(22) Filed: Dec. 4, 2007

(65) Prior Publication Data

US 2009/0144503 A1    Jun. 4, 2009

(51) Int. Cl.
*G06F 12/00* (2006.01)
*G06F 13/00* (2006.01)
*G06F 13/28* (2006.01)

(52) U.S. Cl. .............. 711/136; 711/128; 711/E12.043
(58) Field of Classification Search .............. None
See application file for complete search history.

(56) References Cited

U.S. PATENT DOCUMENTS

| | | | |
|---|---|---|---|
| 4,625,296 A | 11/1986 | Shriver | |
| 5,390,308 A | 2/1995 | Ware et al. | |
| 5,422,846 A | 6/1995 | Chang et al. | |
| 5,895,487 A * | 4/1999 | Boyd et al. | 711/122 |
| 6,148,294 A | 11/2000 | Beyda et al. | |
| 6,295,593 B1 | 9/2001 | Hsu et al. | |
| 6,311,280 B1 | 10/2001 | Vishin | |
| 6,347,357 B1 | 2/2002 | Sartore et al. | |
| 6,389,505 B1 | 5/2002 | Emma et al. | |
| 6,556,501 B1 | 4/2003 | Naffziger | |
| 6,625,056 B1 | 9/2003 | Kihara | |
| 6,678,814 B2 | 1/2004 | Arimilli et al. | |
| 6,697,909 B1 | 2/2004 | Wang et al. | |
| 6,775,176 B2 | 8/2004 | Kihara | |
| 6,819,618 B2 | 11/2004 | Kashiwazaki | |

(Continued)

OTHER PUBLICATIONS

Jim Handy, (The Cache Memory Book: The Authoritative Reference on Cache Design), Second Edition, Academic Press, 1998, pp. 34-35 and 210-211.*

(Continued)

*Primary Examiner* — Matt Kim
*Assistant Examiner* — Christopher D Birkhimer
(74) *Attorney, Agent, or Firm* — Cantor Colburn LLP; Michael LeStrange

(57) ABSTRACT

A method of integrating a hybrid architecture in a set associative cache having a first type of memory structure for one or more ways in each congruence class, and a second type of memory structure for the remaining ways of the congruence class, includes determining whether a memory access request results in a cache hit or a cache miss; in the event of a cache miss, determining whether LRU way of the first type memory structure is also the LRU way of the entire congruence class, and if not, then copying the contents of the LRU way of the first type memory structure into the LRU way of the entire congruence class, and filling the LRU way of the first type memory structure with a new cache line in the event of a cache miss; and updating LRU bits, depending upon the results of the memory access request.

27 Claims, 10 Drawing Sheets

U.S. PATENT DOCUMENTS

| | | |
|---|---|---|
| 6,826,106 B2 | 11/2004 | Chen |
| 6,944,713 B2 * | 9/2005 | Clark et al. .................. 711/128 |
| 6,965,536 B2 | 11/2005 | Shirley |
| 7,038,940 B2 | 5/2006 | Swanson et al. |
| 7,039,756 B2 | 5/2006 | Emerson et al. |
| 2002/0138690 A1 | 9/2002 | Simmonds et al. |
| 2003/0053361 A1 | 3/2003 | Zhang et al. |
| 2003/0218930 A1 | 11/2003 | Lehmann et al. |
| 2005/0002253 A1 | 1/2005 | Shi et al. |
| 2005/0102475 A1 | 5/2005 | Reohr et al. |
| 2005/0108460 A1 | 5/2005 | David |
| 2006/0036811 A1 | 2/2006 | Diefferderfer et al. |
| 2006/0041720 A1 | 2/2006 | Hu et al. |
| 2006/0107090 A1 | 5/2006 | Emma et al. |
| 2006/0133173 A1 | 6/2006 | Jain et al. |
| 2006/0190676 A1 | 8/2006 | Butler et al. |
| 2007/0136523 A1 | 6/2007 | Bonella et al. |

OTHER PUBLICATIONS

David D. Lee et al., "Using Cache Mechanisms to Exploit Nonrefreshing DRAM's for On-Chip Memories," IEEE Journal of Colid-State Circuits, No. 4, Apr. 1991.

Jim Handy, "The Cache Memory Book: The Authoritative Reference on Cache Design," Second Edition, Academic Press, pp. 34-35, 1998.

IBM Technical Disclosure Bulletin, "Master Slave Organization of DRAM Cache," vol. 36, Issue 1, pp. 381-383, Jan. 1993.

U.S. Appl. No. 11/949,904; Non-Final Office Action, Date Filed: Dec. 4, 2007; Date Mailed: Jan. 4, 2011.

\* cited by examiner

METHOD AND SYSTEM FOR INTEGRATING SRAM AND DRAM ARCHITECTURE IN SET ASSOCIATIVE CACHE

BACKGROUND

The present invention relates generally to integrated circuit memory devices and, more particularly, to a method and system for integrating SRAM and DRAM architecture in a set associative cache.

Memory devices are used in a wide variety of applications, including computer systems. Computer systems and other electronic devices containing a microprocessor or similar device typically include system memory, which is generally implemented using dynamic random access memory (DRAM). A DRAM memory cell generally includes, as basic components, an access transistor (switch) and a capacitor for storing a binary data bit in the form of an electrical charge. Typically, a first voltage is stored on the capacitor to represent a logic high or binary "1" value (e.g., $V_{DD}$), while a second voltage on the storage capacitor represents a logic low or binary "0" value (e.g., ground). A principal advantage of DRAM is that it uses relatively few components to store each bit of data, and is thus a relatively inexpensive means for providing system memory having a relatively high capacity.

One disadvantage of DRAM, however, is that the individual DRAM memory cells must be periodically refreshed as the charge on the capacitor eventually leaks away and therefore provisions must be made to "refresh" the capacitor charge. Otherwise, the data bit stored by the memory cell is lost. While an array of memory cells is being refreshed, it cannot be accessed for a read or a write memory access. The need to refresh DRAM memory cells does not present a significant problem in most applications; however, it can prevent the use of DRAM in applications where immediate access to memory cells is required or highly desirable.

On the other hand, a static random access memory (SRAM) cell does not require a refresh of the data stored therein, so long as power to the device remains on. However, whereas an SRAM is typically implemented using six transistors for example, a DRAM cell uses just a single transistor and a capacitor as indicated above. The SRAM cell is therefore less dense than the DRAM cell, requiring more area per bit of storage. On the other hand, the SRAM cell is faster to access (due to the time required to charge and discharge the DRAM capacitor, as well as the need to refresh the DRAM cell at regular intervals). Accordingly, a memory having the density characteristics of DRAM with the access latency of SRAM would be preferable to either base technology.

Although a number of memory designs have been proposed and implemented in an attempt to provide the density of DRAM with the latency of SRAM, most of these take the form of incorporating an SRAM cache in an otherwise standard DRAM array, such that the SRAM holds the contents of the most recently accessed DRAM data block. To the extent that the same block of data is soon referenced again, it can be accessed at SRAM speeds. However, these approaches involve significant overhead in area and control circuitry, as well as significant design effort for new facilities.

SUMMARY

The foregoing discussed drawbacks and deficiencies of the prior art are overcome or alleviated by a method of integrating a hybrid architecture in a set associative cache, the cache having a first type of memory structure used to implement one or more ways in each congruence class of the cache, and a second type of memory structure used to implement the remaining ways of the congruence class, the method including upon a memory access request, determining whether the access request results in a cache hit or a cache miss; in the event of a cache miss, determining whether the least recently used (LRU) way of the first type memory structure is also the LRU way of the entire congruence class, and in the event the LRU way of the first type memory structure is not the LRU way of the entire congruence class, then copying the contents of the LRU way of the first type memory structure into the LRU way of the entire congruence class, and further, in the event of a cache miss, filling the LRU way of the first type memory structure with a new cache line in accordance with the memory access request; and regardless of a cache hit or miss, updating LRU bits, depending upon the results of the memory access request.

In another embodiment, a system for integrating a hybrid architecture in a set associative cache includes a first type of memory structure used to implement one or more ways in each congruence class of the cache; a second type of memory structure used to implement the remaining ways of the congruence class of the cache; and a cache controller, the cache controller configured to determine, upon a memory access request, whether the access request results in a cache hit or a cache miss; in the event of a cache miss, the cache controller determines whether the least recently used (LRU) way of the first type memory structure is also the LRU way of the entire congruence class, and in the event the LRU way of the first type memory structure is not the LRU way of the entire congruence class, then copies the contents of the LRU way of the first type memory structure into the LRU way of the entire congruence class, and further, in the event of a cache miss, the controller fills the LRU way of the first type memory structure with a new cache line in accordance with the memory access request; and regardless of a cache hit or miss, the controller updates LRU bits, depending upon the results of the memory access request.

In still another embodiment, a computer program product includes a computer readable computer program code including instructions for causing a computer to implement a method of integrating a hybrid architecture in a set associative cache, the cache having a first type of memory structure used to implement one or more ways in each congruence class of the cache, and a second type of memory structure used to implement the remaining ways of the congruence class, the method further including: upon a memory access request, determining whether the access request results in a cache hit or a cache miss; in the event of a cache miss, determining whether the least recently used (LRU) way of the first type memory structure is also the LRU way of the entire congruence class, and in the event the LRU way of the first type memory structure is not the LRU way of the entire congruence class, then copying the contents of the LRU way of the first type memory structure into the LRU way of the entire congruence class, and further, in the event of a cache miss, filling the LRU way of the first type memory structure with a new cache line in accordance with the memory access request; and regardless of a cache hit or miss, updating LRU bits, depending upon the results of the memory access request.

BRIEF DESCRIPTION OF THE DRAWINGS

Referring to the exemplary drawings wherein like elements are numbered alike in the several Figures.

DETAILED DESCRIPTION

Disclosed herein is a method and system for integrating and managing a hybrid SRAM/DRAM architecture in a set associative cache in a manner that combines the advantageous characteristics of both (i.e., the quick access of SRAM and the increased density of DRAM). Briefly stated, a cache management scheme is introduced for an SRAM/DRAM cache architecture such that the probability of accessing the SRAM ways of the cache is increased and/or maximized based, in part, on the state of the least recently used (LRU) tracking bits for each congruence class of the SRAM/DRAM set associative cache.

As described in further detail herein, the present invention embodiments utilize a hybrid architecture for a cache, in which a first type of memory structure (e.g., SRAM) is used to implement one or more ways in each congruence class of a set associative cache, while a second type of memory structure (e.g., DRAM) is used to implement the remaining ways. The first type of memory structure is one that provides superior access time performance, while the second type of memory structure provides better density. The cache management is used to place and copy data into those ways in a manner such that the majority of the accesses will be to the faster (e.g., SRAM) ways of the first type of memory structure. The embodiments herein introduce a novel application of the LRU bits found in a conventional set associative cache.

Figure 1:
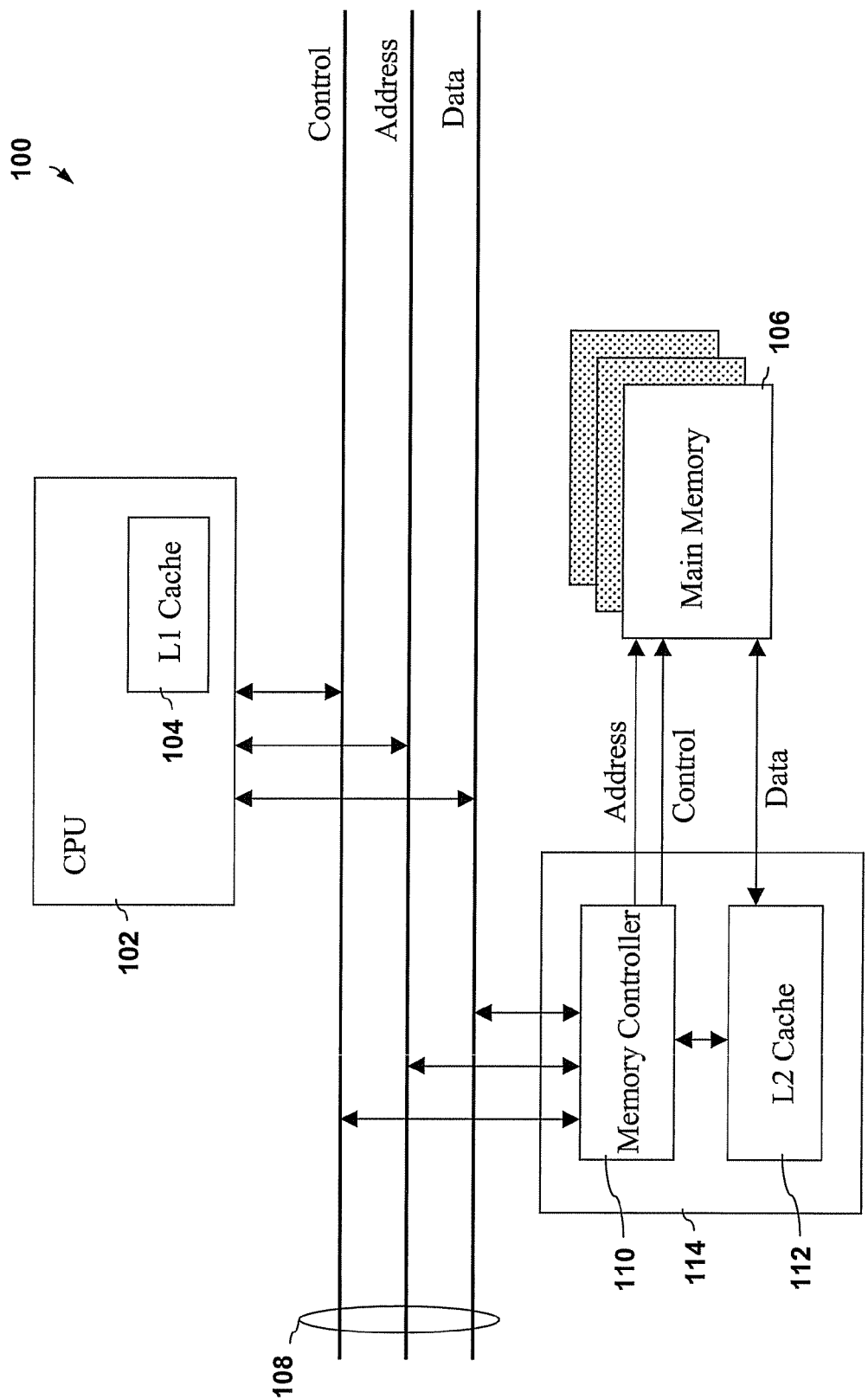
FIG. 1 is a schematic block diagram illustrating an exemplary memory organization of a computer system suitable for use in accordance with an embodiment of the present invention.

Referring initially to FIG. 1, there is shown a block diagram illustrating an exemplary memory organization of a computer system 100 suitable for use in accordance with an embodiment of the present invention. The computer system 100 includes a central processing unit (CPU) 102 with an on-chip cache memory (L1 Cache) 104, a main memory 106, CPU bus 108, a memory controller 110 for controlling data traffic on the CPU bus 108, and a second level cache memory (L2 Cache) 112.

The first level cache memory 104 is integrated on the same chip with the CPU 102 and, as a result, is faster than main memory 106 with a higher bandwidth and shorter wire length, therefore avoiding any delay associated with transmitting and/or receiving signals to and/or from an external chip. The second level cache memory 112 in FIG. 1 is shown located on a different chip 114 than the CPU 102, and has a larger capacity than the first level cache memory 104 but smaller than the main memory 106. In an alternate configuration of the memory organization, the second level cache memory 112 could also be located on the same chip as the CPU 102.

The cache memories 104, 112 serve as buffers between the CPU 102 and the main memory 106. In each of the cache memories 104, 112, data words are stored in a cache memory and are grouped into small pages called "cache blocks" or "cache lines". The contents of the cache memory are a copy of a set of main memory blocks. Each cache line is marked with a "TAG address" that associates the cache line with a corresponding part of the main memory. TAG addresses (which may be non-continuous) assigned to the corresponding cache lines are stored in a special memory, called a TAG memory or directory.

In the first level cache memory 104, when an address is requested by the CPU 102 to access certain data, the requested address is compared to TAG addresses stored in a TAG memory of the first level cache memory 104. If the requested address is found among the TAG addresses in the TAG memory, it is determined that data corresponding to the requested address is present in the cache memory 104, which is referred to as a "hit". Upon finding the data of the requested address in the cache memory 104, the data is transferred to the CPU 102. The TAG memory may also contain an offset address to locate the data in the cache memory 104. Locating data in a cache memory is well known in the art, thus a detailed description thereof is omitted herein.

On the other hand, if the requested address is not found in the TAG memory of the cache memory 104, it is determined that the data corresponding to the requested address is not present in the cache memory 104, which is referred to as a "miss". When a miss occurs in the first level cache memory 104, the requested address is sent to a lower level memory, for example, the second level cache memory 112. If a miss occurs in the second level cache memory 112 (i.e., the data is not present in the second level cache memory), the requested address is sent to a third level cache memory (if available) or a main memory.

Thus, a method and system for integrating and managing a hybrid SRAM/DRAM architecture in a set associative cache may be described, for example, with respect to the second level cache memory 112. However, it should be noted that the present invention embodiments apply to any cache memory used in a hierarchical memory system to support main memory. Therefore, in the event that a SRAM/DRAM set associative cache is used for the first level cache memory 104, the method and system described herein is also applicable with respect to the first level cache memory 104.

Figure 2:
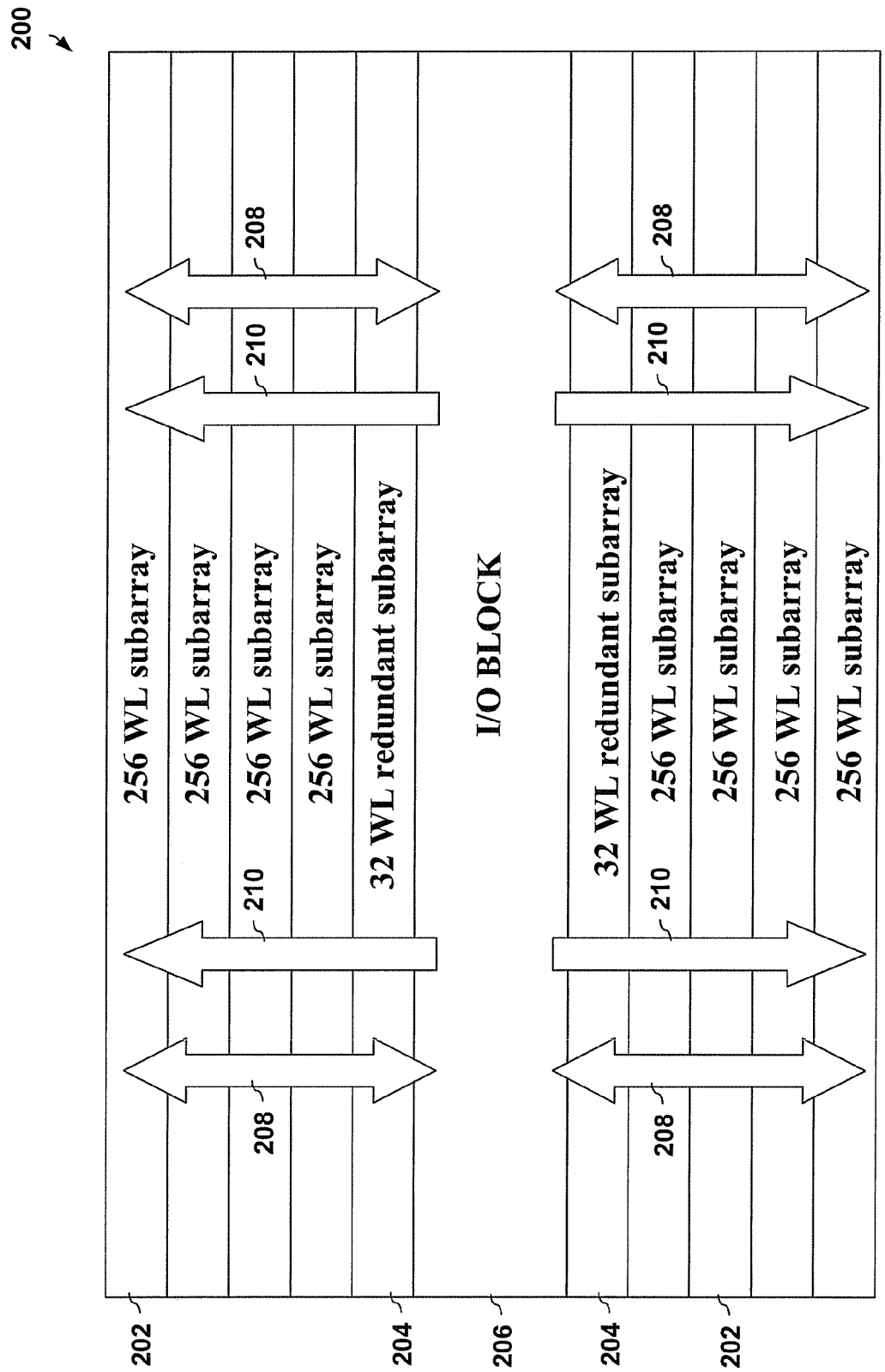
FIG. 2 is a schematic diagram of a current embedded DRAM (eDRAM) design suitable for use in accordance with an embodiment of the invention.

Referring now to FIG. 2, the physical organization of an exemplary embedded DRAM (eDRAM) architecture 200 is depicted. The array architecture 200 is organized as a series of subarrays, each corresponding to a set of 256 word lines (WL) for example, in addition to a redundant subarray 204 for redundant word line rows. An input/output (I/O) block 206 is located in a center portion of the array, and provides the appropriate control signals for the main subarrays 202 and redundant subarrays 204. Data lines 208 transport data between the I/O block 206 and the subarrays 202, 204, while address lines 210 control the selection of word lines and bit lines of the subarrays 202, 204.

Figure 3:
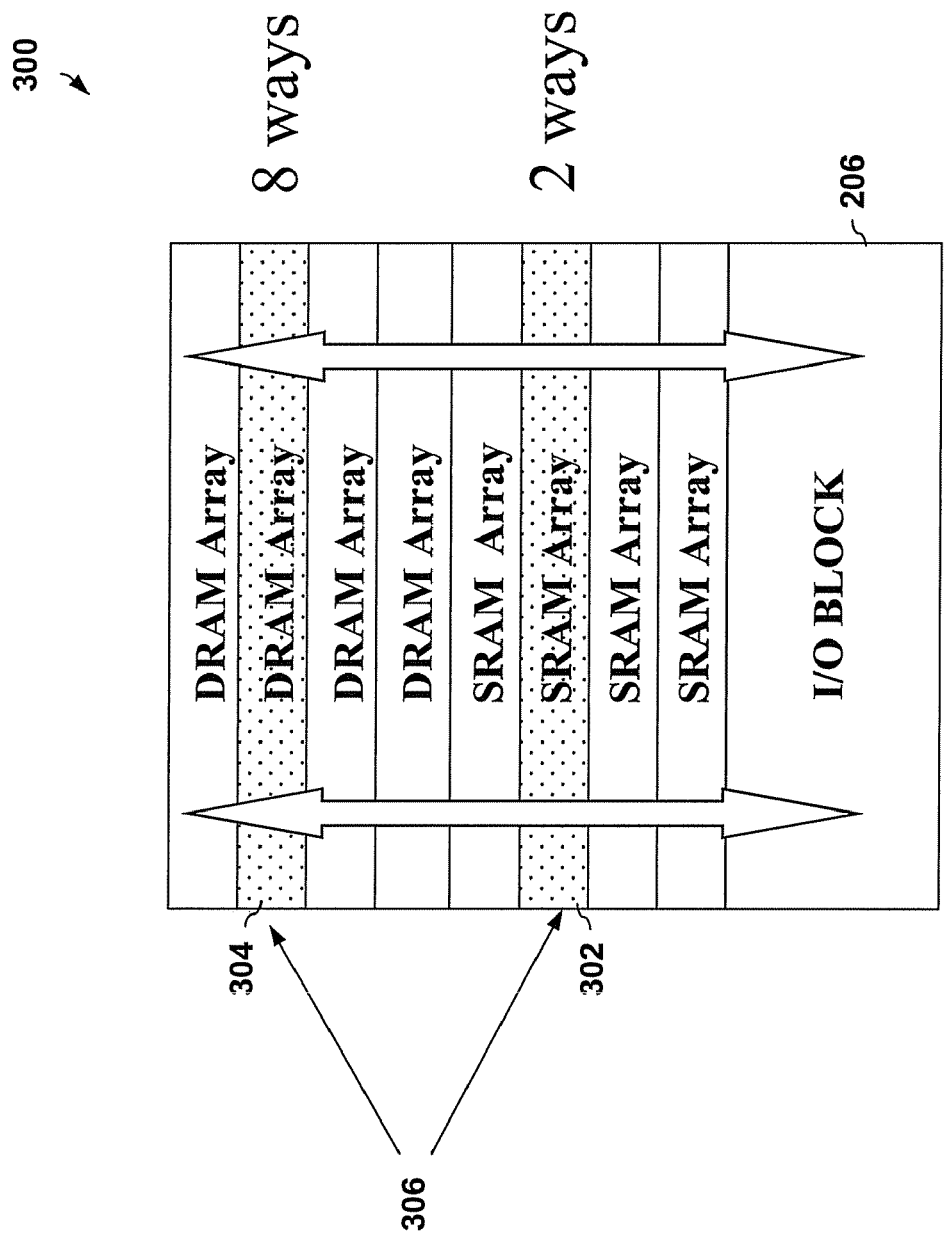
FIG. 3 is a schematic representation of a combination SRAM/DRAM set associative cache structure having one or more ways of SRAM cells and additional ways of DRAM cells, in accordance with an embodiment of the invention.

FIG. 3 is a schematic representation of a combination SRAM/DRAM set associative cache structure 300 having one or more ways of SRAM cells and additional ways of DRAM cells, in accordance with an embodiment of the invention. In the embodiment illustrated, the cache structure 300 represents a modification of the organization of FIG. 2, in which some subarrays are implemented using DRAM cells, and others using SRAM cells. In this particular example, the cache structure 300 is a 10-way set associative cache, where each SRAM subarray 302 comprises two ways of a congruence class (or set) 306 of cache lines, and is associated with a corresponding DRAM subarray 304 that comprises eight additional ways of that congruence class 306. As will be appreciated however, different numbers of SRAM and DRAM ways may also be utilized for a congruence class, and thus the specific examples presented herein should not be construed in any limiting sense. Regardless of the way-breakdown between SRAM and DRAM ways in a congruence class, the exemplary embodiments herein contemplate a "shared word line" cache as described in further detail below.

Figure 4:
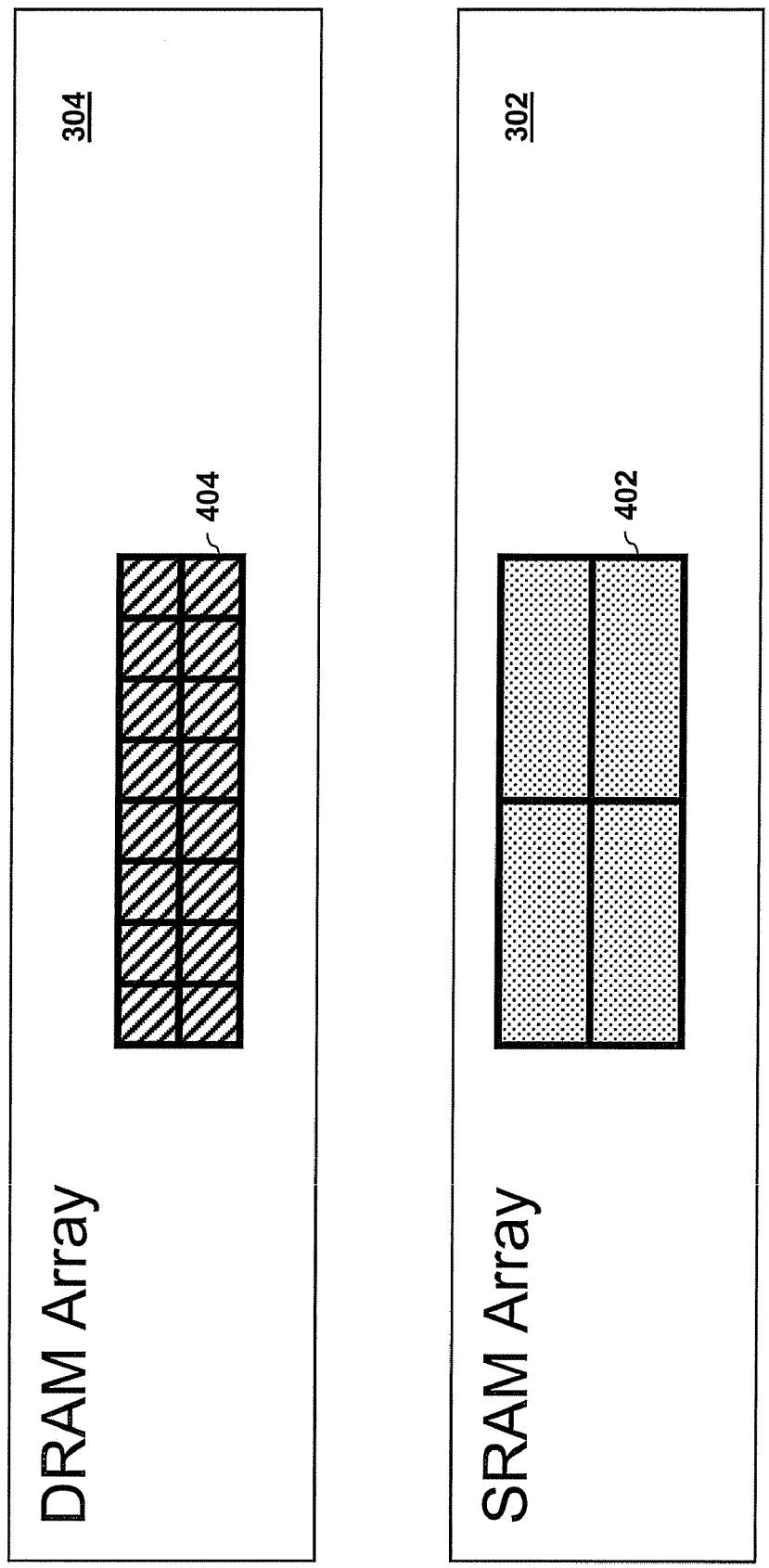
FIG. 4 is a schematic representation of the relative pitch layout of the SRAM cell ways and the DRAM cells ways, for the exemplary 10-way set associative cache of FIG. 3.

For the specific example of a 10-way set associativity with two ways of SRAM cells and eight ways of DRAM cells per congruence class, four DRAM ways may be implemented for every one SRAM way, in order to match bit cell pitch. FIG. 4 is a schematic representation of the relative pitch layout of the SRAM cell ways of an SRAM subarray 302 and the DRAM cell ways in a DRAM subarray 304 for the exemplary 10-way set associative cache of FIG. 3. In particular, FIG. 4 illustrates the alignment pitch of the two types of subarray, given the larger (e.g., 4×) size of the SRAM cell 402 with respect to the DRAM cell 404. The word lines in corresponding DRAM and SRAM subarrays are logically shared, but physically separate, and thus they may be driven by voltages appropriate to each cell type.

Figure 5:
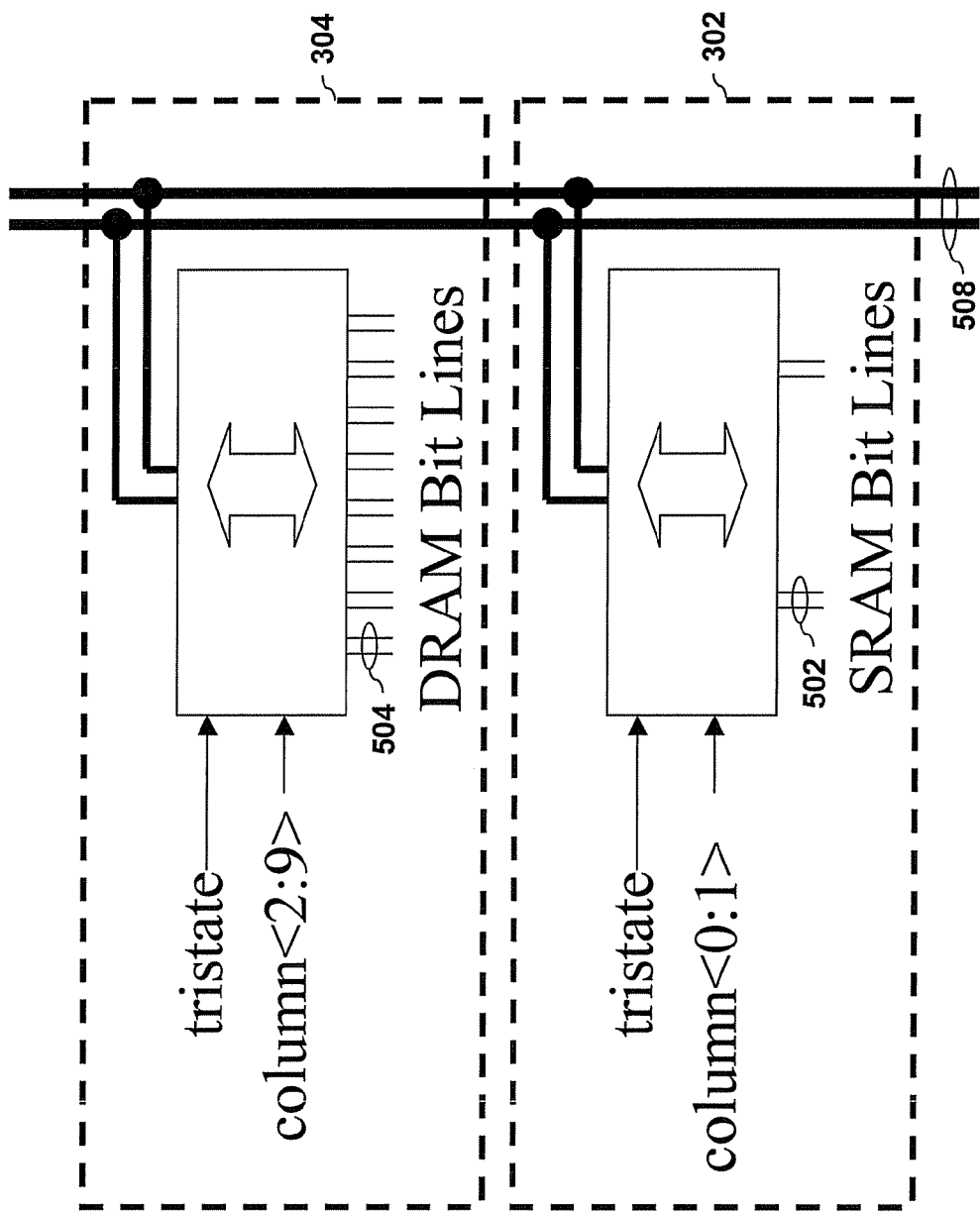
FIG. 5 is a schematic diagram of the data bus connections of the SRAM and DRAM ways of the exemplary 10-way set associative cache of FIGS. 3 and 4.

FIG. 5 is a schematic diagram of the data bus connections of the SRAM and DRAM ways of the exemplary 10-way set associative cache of FIGS. 3 and 4. When a congruence class is addressed, the two physical word lines associated with each memory type are simultaneously activated in order to access all ten ways (ways 0-1 of the SRAM subarray 302, and ways 2-9 of the DRAM subarray 304). One of the ten ways activated is then selected from among the two SRAM bit line pairs 502 and the eight DRAM bit line pairs 504 to connect to the data bus 508 that is shared among the subarrays.

Although the exemplary SRAM/DRAM cache embodiments described above have a number of advantages from a physical standpoint alone, a method of managing such a cache, as described next, is applicable to any SRAM/DRAM cache implementation in which some ways in each congruence class are implemented in DRAM and other ways in SRAM. Even more generally speaking, the method is further applicable to any hybrid cache having a first type of memory structure and a second type memory structure.

A cache controller typically uses a least recently used (LRU) algorithm to determine which cache line to replace whenever a new line is to be cached. The LRU algorithm maintains an encoding of the ordering of the ways in each congruence class, from the most recently used (MRU) to the least recently used. Given the temporal locality of references, the current MRU way is the most likely to be referenced next. More generally stated, the more recently used ways have a higher probability of being referenced in the near future. Accordingly, the cache management methodology disclosed herein is designed to maintain the MRU way (and more generally, the more recently used ways) in SRAM, such that most cache accesses come from the SRAM portion of the cache.

Figure 6:
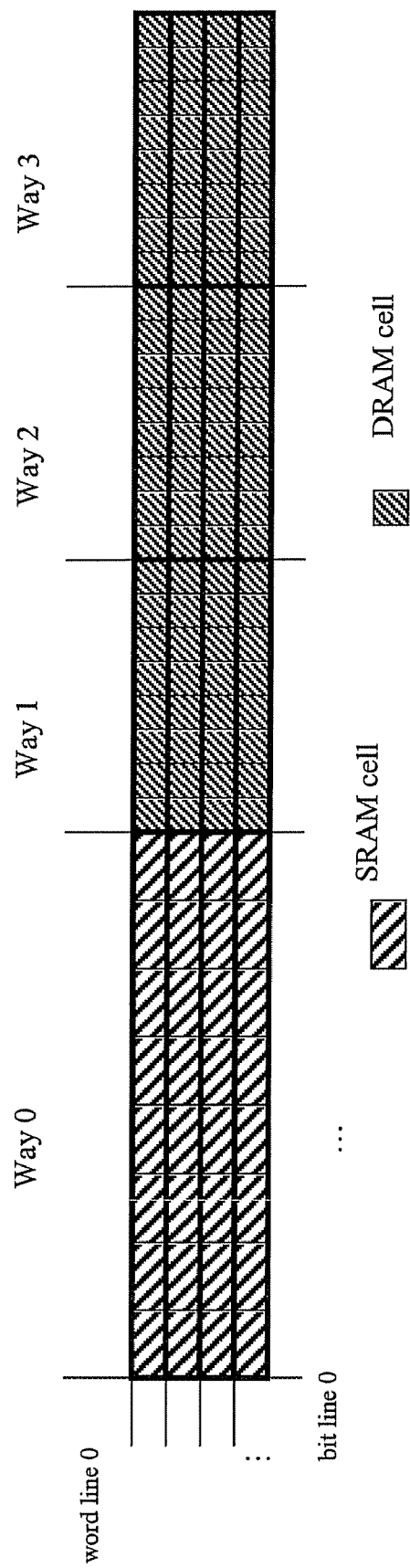
FIG. 6 is a schematic diagram illustrating the organization of a combination SRAM/DRAM set associative cache structure, having a 4-way set associativity with one SRAM way and three DRAM ways, in accordance with another exemplary embodiment of the invention.

For simplicity of explanation, it will be assumed that the first way (or two or more of the lowest numbered ways) is implemented in SRAM, while the remaining higher numbered ways are implemented in DRAM. For example, FIG. 6 is a schematic diagram illustrating the organization of a combination SRAM/DRAM set associative cache structure, having a 4-way set associativity with one SRAM way and three DRAM ways. In this example, the first way (way 0) is implemented in SRAM while the other three ways (way 1, way 2, way 3) are implemented in DRAM. Again, it should be understood that the cache management methodology also applies to caches with multiple ways implemented in SRAM.

Figure 7:
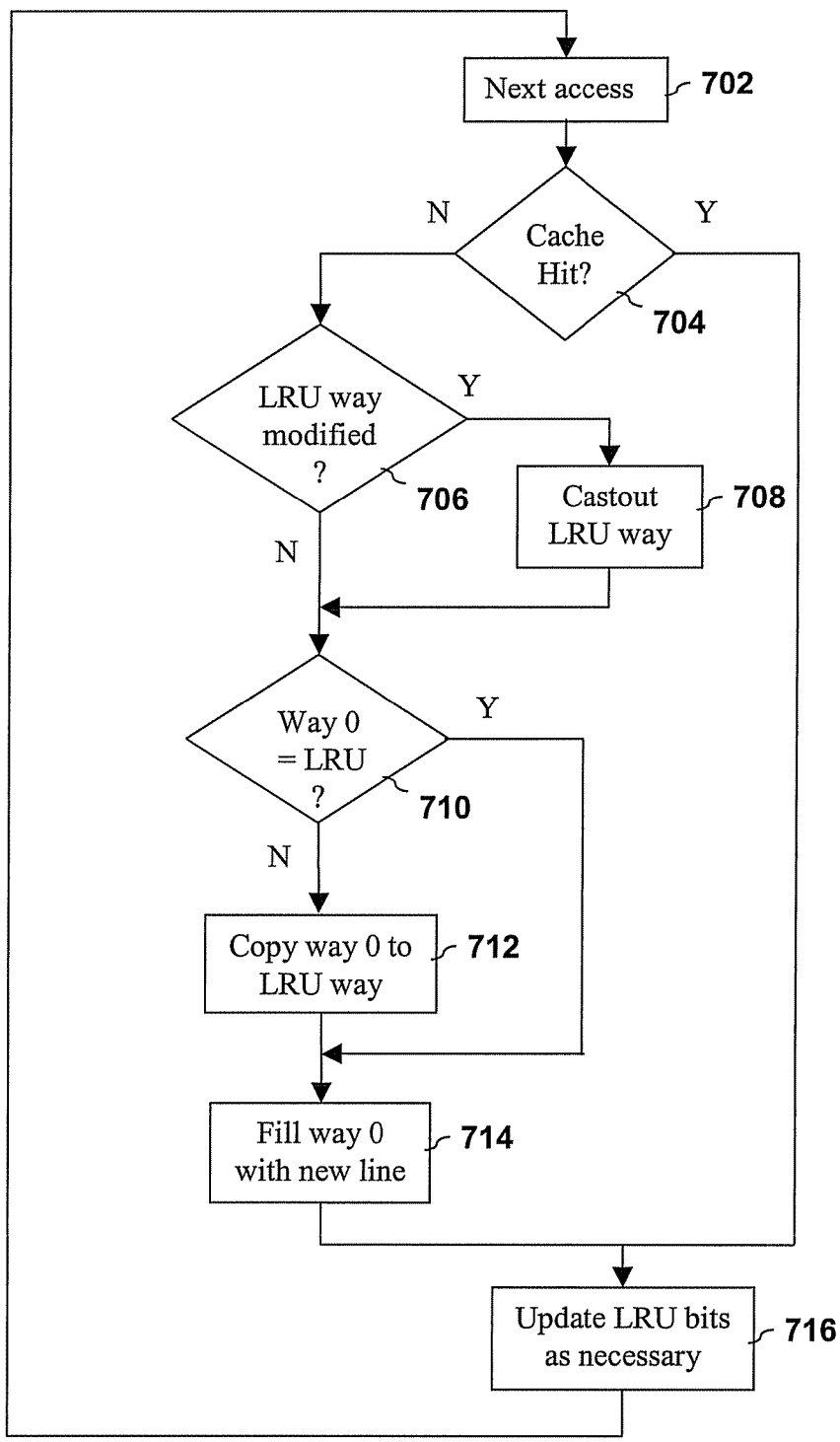
FIG. 7 is a flow diagram illustrating a method of managing a SRAM/DRAM set associative cache structure, in accordance with a further embodiment of the invention.

Referring now to FIG. 7, there is shown a flow diagram 700 illustrating a method of managing a SRAM/DRAM set associative cache structure, in accordance with a further embodiment of the invention. The method begins at block 702, where a next memory access operation takes place. If a cache miss occurs (as reflected in decision block 704), it is then determined in decision block 706 whether the data in the LRU way of the set has been modified. If so, the LRU way is first cast out to the next level of memory hierarchy before proceeding to decision block 710. Otherwise, the method proceeds to decision block 710 to see whether the LRU way corresponds to way 0. If not, then the data of way 0 in the set is copied to the LRU way in the set, as shown in block 712. Then, the new cache line is stored in way 0 in the set (i.e., in faster SRAM) in block 714. By definition, the new line brought into way 0 of the cache becomes the MRU line. On the other hand, if the LRU corresponds to way 0, then the copy operation may be omitted since the previous cache line in way 0 will be ejected as the new line is filled into way 0. Finally, in block 716, the LRU bits are updated, if applicable, to keep track of the ordering of most to least recently used ways of the set. In this embodiment, a cache hit (i.e., the "YES" path of decision block 704) results in the method proceeding directly to block 716 to update the LRU bits if need be.

Normally, a cache controller would conventionally select the LRU line to replace with a new line. In contrast, the present approach writes the new incoming cache line to way 0 (i.e., an SRAM portion of the cache), with the previous line in way 0 being copied to the way containing the LRU line. Therefore, every new line brought into the cache starts out, by definition, as the MRU line in way 0. Whenever a cache hit occurs, the hit is likely to occur at the MRU way associated with the faster SRAM, and in such a case the recently used ordering need not change.

Table 1 below illustrates the content and placement of a 4-way set associative congruence class in which the cache management method of FIG. 7 is executed. In the table, the uppercase letters identify cache lines, and numbers 0 through 3 denote recent usage ordering from MRU (0) to LRU (3). Way 0 is embodied by SRAM, while ways 1-3 are embodied by DRAM.

TABLE 1

|  | way 0 | way 1 | way 2 | way 3 |
|---|---|---|---|---|
| Initial state | A 0 | B 1 | C 2 | D 3 |
| Hit B (change LRU bits only) | A 1 | B 0 | C 2 | D 3 |
| Miss E (line A moved to way 3) | E 0 | B 1 | C 3 | A 2 |
| Hit E (no change) | E 0 | B 1 | C 3 | A 2 |
| Hit C (change LRU bits only) | E 1 | B 2 | C 0 | A 3 |
| Miss F (line E moved to way 3) | F 0 | B 3 | C 1 | E 2 |

As can be seen from Table 1, the initial state of the 4-way cache includes cache lines A, B, C and D, respectively, located in ways 0, 1, 2 and 3. Moreover, the initial usage ordering of the cache corresponds to the numbering of the ways (i.e., way 0 is the MRU, way 1 is the next most recently used, then way 2, and finally way 3 is the LRU). The next access corresponds to a cache hit of line B located in way 1. In this case, there is no filling of a way with a new cache line. Rather, the only change at this point is an update of the LRU bits to reflect that way 1 is now the MRU way, and way 0 is now the next most recently used way.

Subsequently, the next access is a miss for cache line E (i.e., line E is not in any of the 4 ways of the cache. Thus, the contents of way 0 (i.e., line A) are copied into the current LRU way (i.e., way 3). If the prior contents of way 3 to be ejected from the cache (i.e., line D) have been modified, then they are cast out to the next level hierarchy as indicated in FIG. 7. Regardless, the copying of line A from way 0 to way 3 then allows the new line (line E) to be moved into way 0. By definition, way 0 becomes the MRU way upon placement of each new line therein. Then, way 1 becomes the next most MRU way, followed by way 3 and finally way 2 is the LRU way.

As a result of the next access in Table 1, there is a cache hit of line E in way 0. Notably, this is the condition that is sought by the present approach; i.e., a cache hit in a fast SRAM. Moreover, a hit of a cache line placed in way 0 during the preceding cycle results in no reordering of the LRU bits. As shown in the next access cycle, there is a cache hit of line C in way 2, resulting in a reordering of the LRU bits to reflect that way 2 is now the MRU way. Finally, in the next access in Table 1, there is a cache miss for line F. Accordingly, the contents of way 0 (line E) are copied to the previous LRU way (way 3), while the new line F is moved into way 0. The LRU bits are reordered to reflect that way 0 is now the MRU.

Although the copying of the line in way 0 to a different way as the result of a cache miss results in an extra read and write of a full cache line (except in the case when the LRU is actually way 0 as indicated above), given the high percentage of hits versus misses, the actual overhead required can be relatively small.

Figure 8:
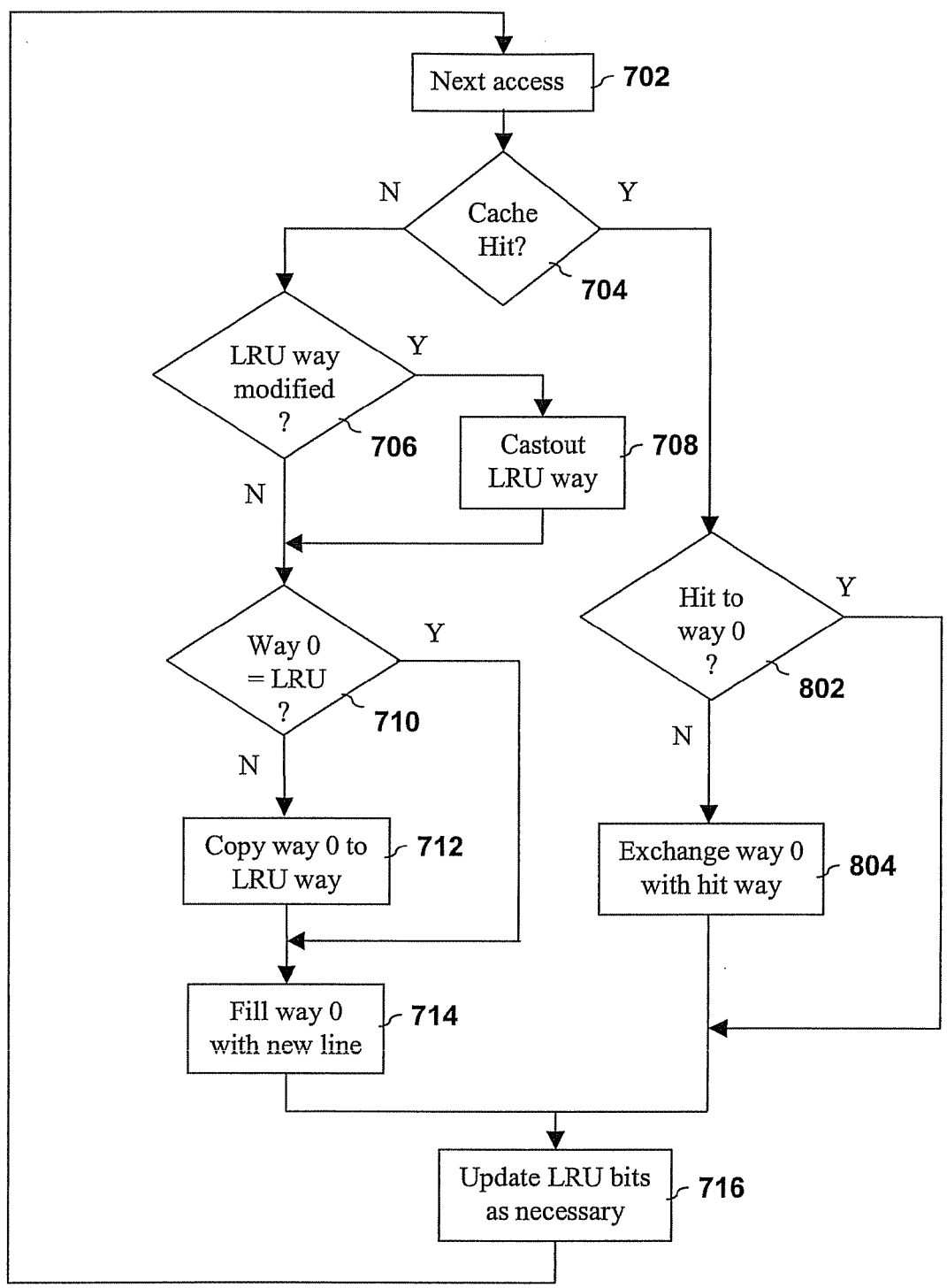
FIG. 8 is a flow diagram illustrating a variation of the method of managing a SRAM/DRAM set associative cache structure of FIG. 7, in accordance with a further embodiment of the invention.

FIG. 8 is a flow diagram of a slightly modified version of FIG. 7, in accordance with an alternative embodiment of the invention. With respect to a cache hit, the flow diagram 800 of FIG. 8 includes the additional operation of determining whether the hit way is way 0 in decision block 802 and, if not, exchanging way 0 with the hit way, as shown in block 804. While this increases the number of potential operations, it also increases the likelihood of the hit way being accessed again, but in an SRAM device. Table 2 below illustrates the operations resulting from the access requests shown in Table 1, but using the added operation 802 of FIG. 8:

TABLE 2

|  | way 0 | way 1 | way 2 | way 3 |
|---|---|---|---|---|
| Initial state | A 0 | B 1 | C 2 | D 3 |
| Hit B (exchange lines B and A) | B 0 | A 1 | C 2 | D 3 |
| Miss E (line B moved to way 3) | E 0 | A 2 | C 3 | B 1 |
| Hit E (no change) | E 0 | A 2 | C 3 | B 1 |
| Hit C (exchange lines C and E) | C 0 | A 3 | E 1 | B 2 |
| Miss F (line C moved to way 1) | F 0 | C 1 | E 2 | B 3 |

It will be noted from Table 2 that for the embodiment of FIG. 8 where way 0 is exchanged with the hit way for a cache hit, the result is that way 0 is maintained as the MRU way since it contains the cache line that has been hit.

Figure 9:
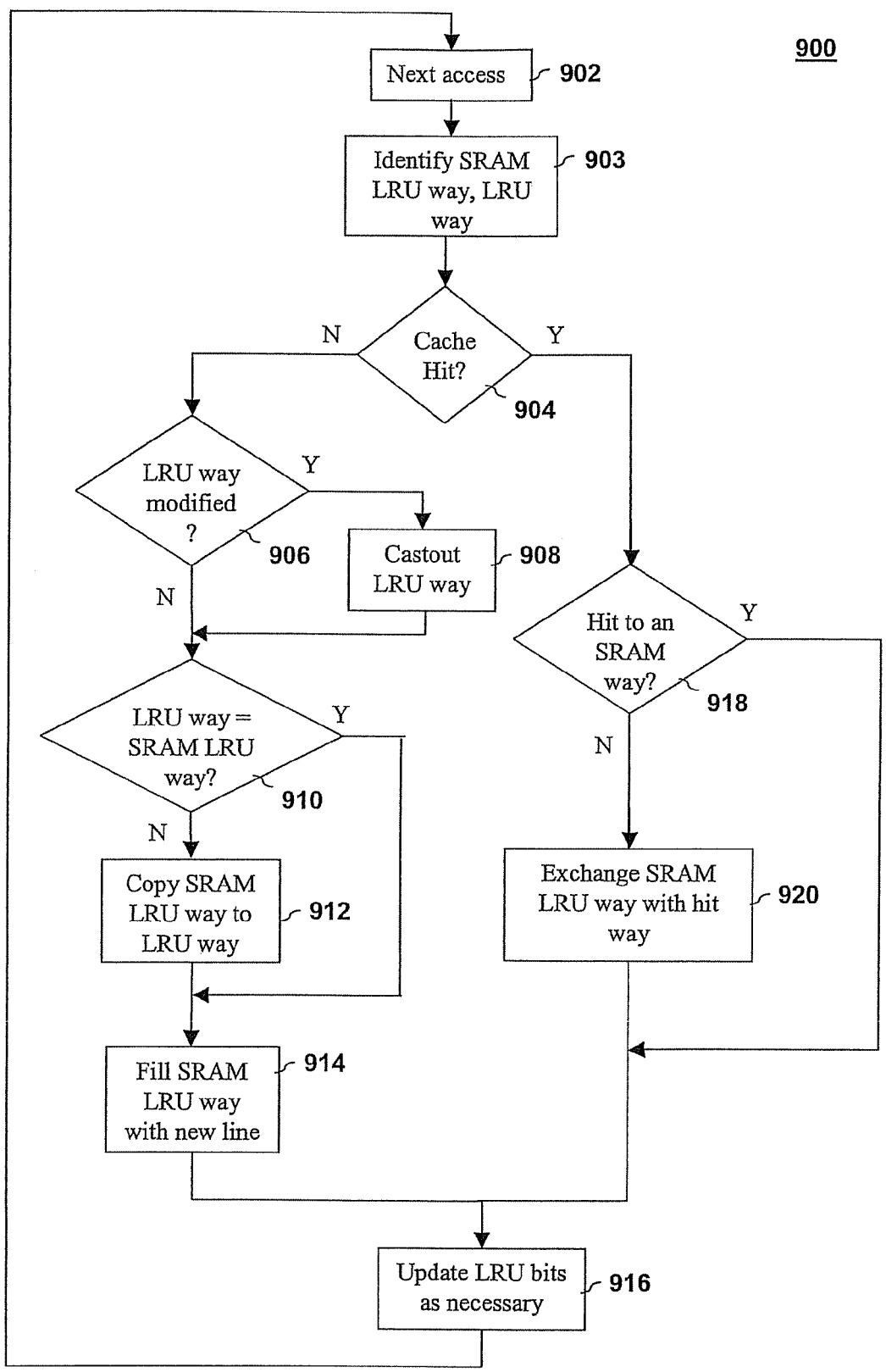
FIG. 9 is a flow diagram illustrating a method of managing a SRAM/DRAM set associative cache structure, in accordance with a further embodiment of the invention.

While the flow diagrams of FIGS. 7 and 8 illustrate a specific architecture embodiment where there is a single SRAM way in a congruence class, a more general process flow 900 is shown in FIG. 9, wherein more than one way in a congruence class can comprise SRAM (e.g., as is the case for FIGS. 3 through 5 where a 10-way set associative cache includes 2 SRAM ways and 8 DRAM ways). Upon a next memory access operation in block 902, the LRU SRAM way is identified, along with the overall LRU way. If a cache miss occurs (as reflected in decision block 904), it is then determined in decision block 906 whether the data in the LRU way of the set has been modified. If so, the LRU way (whether it happens to be in SRAM or DRAM) is first cast out to the next level of memory hierarchy before proceeding to decision block 910.

Then, in decision block 910, it is determined whether the LRU way corresponds to the SRAM LRU way. If not, then the data of the SRAM LRU way is copied to the LRU way in the set, as shown in block 912. Then, the new cache line is stored in the SRAM LRU way as reflected in block 914. On the other hand, if the LRU way corresponds to the SRAM LRU way, then the copy operation is omitted and the new line is simply added to the SRAM LRU way. In block 916, the LRU bits are updated to keep track of the ordering of most to least recently used ways of the set. Referring back to decision block 904, in the event of a cache hit, it is then determined in decision block 918 whether the cache hit corresponds to an SRAM way. If not, then the SRAM LRU way data is exchanged with the hit way data, as reflected in block 920. However, as is the case with the embodiment of FIG. 7, the cache hit exchange operation can also be omitted for the general case.

In the embodiments presented thus far, the cache controller focuses on maintaining the most recently used lines in the SRAM ways of the cache. However, the tracking disclosed herein may also be adjusted such that most recently used lines are maintained in DRAM, where they will self-refresh due to frequent access. In contrast, the least recently used lines may be placed in SRAM, where they need not be refreshed. The result is a cache that need not be refreshed. However, since the lines in the DRAM will eventually age, a mechanism is also needed to keep track of which lines in DRAM are still valid. One such tracking mechanism is disclosed in U.S. application Ser. No. 11/950,015 (assigned to the assignee of the present application, and the contents of which are incorporated herein in their entirety).

In still another embodiment, the replacement algorithm may be adjusted to respond to software hints regarding the placement of new lines in the cache. Similar to existing mechanisms that identify transient versus persistent data, load instructions may be defined that carry information on whether the corresponding data should be placed in a lower latency portion of a cache or not. Further, as also indicated above, another contemplated embodiment for a higher level hierarchy application is the use of DRAM (or SRAM) for low latency but non-volatile memory for high density (and non-volatility).

As a practical matter, many cache operations involve access of an entire cache line, such as when that line is copied to the next level of the memory hierarchy. Since the data width of the bus connecting adjacent caches in the hierarchy is typically less than the cache line size, the cache line is partitioned into several segments, and transferred one segment at a time. For example, a 128 byte (B) cache line might be partitioned into four 32 B segments, which are transferred over a 32 B bus. In this case, it is advantageous to implement one or more ways of each set as a "hybrid" memory type, characterized by both SRAM and DRAM cells within the same way. For example, if the first segment of a cache line to be transferred is held in SRAM, while the remaining segments of the cache line are held in DRAM, then the overall access latency corresponds to that of the first (SRAM) segment.

Figure 10:
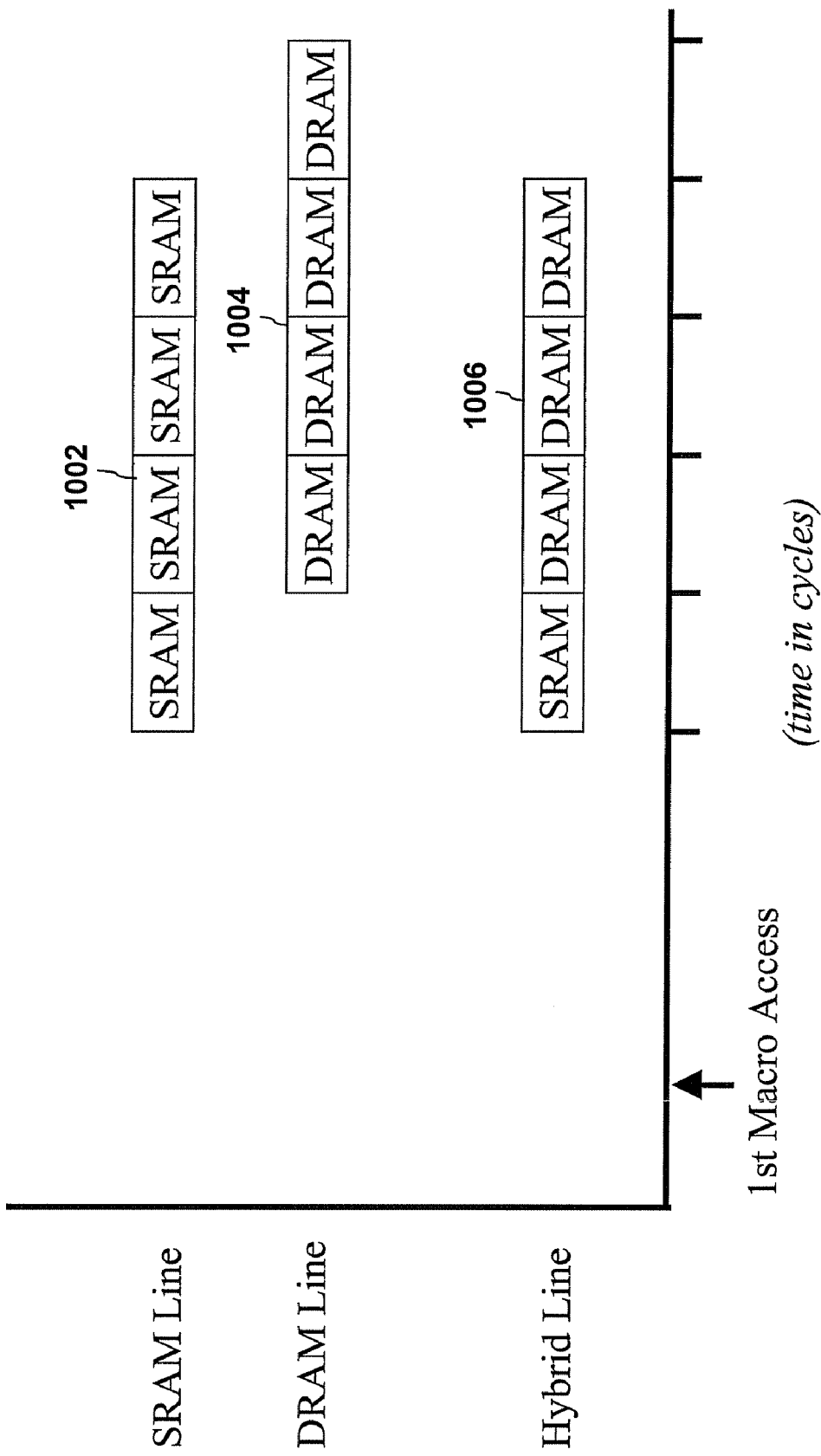
FIG. 10 is a timing diagram illustrating a comparison between access timings associated with a four-segment cache line held entirely in SRAM, a four-segment cache line held entirely in DRAM, and four-segment cache line held in a hybrid SRAM/DRAM way.

In this regard, FIG. 10 depicts an arrangement where even more of the cache can be implemented in DRAM to further improve the memory density, while still maintaining SRAM latency, in accordance with another embodiment of the invention. More specifically, FIG. 10 is a timing diagram illustrating a comparison between access timings associated with a four-segment cache line 1002 held entirely in SRAM, and the corresponding timings associated with a four-segment cache line 1004 held entirely in DRAM. After the first segment is transferred, the delay for additional segments is due to the sharing of the segment-wide bus. As further illustrated, the access timings of a hybrid SRAM/DRAM way 1006 are also shown. Since the first segment to be transferred is in an SRAM portion of the hybrid way 1006, the overall access time is that of SRAM, while the overall memory density needed to store that cache line is closer to that of DRAM.

If this hybrid memory type 1006 is used to implement the ways of each set that would otherwise be implemented entirely as SRAM in the embodiments previously described, the same LRU-based management scheme may be used to determine the assignments of cache lines to ways within each set. However, a further consideration with respect to segmented cache line transfer is the determination of which particular segment(s) of a given cache line are stored in an SRAM portion of the way versus the DRAM portions of the way. One simple yet effective approach is to always assign segment "0" (i.e., the segment containing the data corresponding to the lowest addresses within the cache line) to the SRAM portion of the hybrid way. Due to the common access pattern of sequentially accessing blocks of data in order of ascending addresses, this will result in the first segment often being held in SRAM. The rate at which the first segment is found in SRAM can be increased by a management scheme analogous to the LRU scheme used to manage ways within a set. For example, whenever a cache line is accessed, the first segment that is referenced can be exchanged with the SRAM segment, if it is not already in SRAM, so that future, similar accesses will exhibit the lower SRAM latency. Furthermore, additional status bits in the tag register can be used to keep track of which segment(s) are in SRAM, so that when a cache line is cast out to the next level of cache, that information can be used to optimize placement of the segments when the line is referenced in the future. In this hybrid memory type scheme, whenever the first segment accessed is not in SRAM, the DRAM timings are exhibited for that cache line access.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of integrating a hybrid architecture in a set associative cache, the cache having a first type of memory structure used to implement one or more ways in each congruence class of the cache, and a second type of memory structure used to implement the remaining ways of the congruence class, the method comprising:
   upon a memory access request, determining whether the access request results in a cache hit or a cache miss;
   in the event of a cache miss, determining whether the least recently used (LRU) way of the first type memory structure is also the LRU way of the entire congruence class, and in the event the LRU way of the first type memory structure is not the LRU way of the entire congruence class, then copying the contents of the LRU way of the first type memory structure into the LRU way of the entire congruence class, and
   further, in the event of a cache miss, filling the LRU way of the first type memory structure with a new cache line in accordance with the memory access request; and
   regardless of a cache hit or miss, updating LRU bits, depending upon the results of the memory access request.

2. The method of claim 1, wherein the first type memory structure comprises static random access memory (SRAM) and the second type memory structure comprises dynamic random access memory (DRAM).

3. The method of claim 2, further comprising:
   upon a cache miss, determining whether the LRU way of the entire congruence class has been modified with respect to corresponding data in a higher level memory hierarchy; and
   casting out the LRU way to the higher level memory hierarchy in the event the LRU way of the entire congruence class has been modified, prior to filling the SRAM LRU way with the new cache line.

4. The method of claim 3, further comprising:
   in the event of a cache hit, determining whether the cache hit corresponds to an SRAM way; and
   in the event the cache hit does not correspond to an SRAM way, exchanging the SRAM LRU way with the hit way.

5. The method of claim 1, wherein the first type memory structure comprises dynamic random access memory (DRAM) and the second type memory structure comprises nonvolatile memory.

6. The method of claim 1, wherein the first type memory structure comprises dynamic random access memory (DRAM) and the second type memory structure comprises static random access memory (SRAM).

7. The method of claim 6, wherein the DRAM comprises refreshless DRAM.

8. The method of claim 1, wherein the first type memory structure comprises a hybrid way structure having at least one segment of static random access memory (SRAM) and remaining segments of dynamic random access memory (DRAM) within a single cache line, and the second type memory structure comprises DRAM.

9. The method of claim 8, wherein a cache line segment containing data corresponding to the lowest addresses within the new cache line is copied to the SRAM segment of the hybrid way structure.

10. A system for integrating a hybrid architecture in a set associative cache, comprising:
- a first type of memory structure used to implement one or more ways in each congruence class of the cache;
- a second type of memory structure used to implement the remaining ways of the congruence class of the cache; and
- a cache controller, the cache controller configured to determine, upon a memory access request, whether the access request results in a cache hit or a cache miss;
- in the event of a cache miss, the cache controller determines whether the least recently used (LRU) way of the first type memory structure is also the LRU way of the entire congruence class, and in the event the LRU way of the first type memory structure is not the LRU way of the entire congruence class, then copies the contents of the LRU way of the first type memory structure into the LRU way of the entire congruence class, and
- further, in the event of a cache miss, the controller fills the LRU way of the first type memory structure with a new cache line in accordance with the memory access request; and
- regardless of a cache hit or miss, the controller updates LRU bits, depending upon the results of the memory access request.

11. The system of claim 10, wherein the first type memory structure comprises static random access memory (SRAM) and the second type memory structure comprises dynamic random access memory (DRAM).

12. The system of claim 11, wherein:
- upon a cache miss, the cache controller determines whether the LRU way of the entire congruence class has been modified with respect to corresponding data in a higher level memory hierarchy; and
- the cache controller casts out the LRU way to the higher level memory hierarchy in the event the LRU way of the entire congruence class has been modified, prior to filling the SRAM LRU way with the new cache line.

13. The system of claim 12, wherein:
- in the event of a cache hit, the cache controller determines whether the cache hit corresponds to an SRAM way; and
- in the event the cache hit does not correspond to an SRAM way, the cache controller exchanges the SRAM LRU way with the hit way.

14. The system of claim 10, wherein the first type memory structure comprises dynamic random access memory (DRAM) and the second type memory structure comprises nonvolatile memory.

15. The system of claim 10, wherein the first type memory structure comprises dynamic random access memory (DRAM) and the second type memory structure comprises static random access memory (SRAM).

16. The system of claim 15, wherein the DRAM comprises refreshless DRAM.

17. The system of claim 10, wherein the first type memory structure comprises a hybrid way structure having at least one segment of static random access memory (SRAM) and remaining segments of dynamic random access memory (DRAM) within a single cache line, and the second type memory structure comprises DRAM.

18. The system of claim 17, wherein a cache line segment containing data corresponding to the lowest addresses within the new cache line is copied to the SRAM segment of the hybrid way structure.

19. A computer-readable storage medium storing a computer program product, comprising:
- a computer readable computer program code including instructions for causing a computer to implement a method of integrating a hybrid architecture in a set associative cache, the cache having a first type of memory structure used to implement one or more ways in each congruence class of the cache, and a second type of memory structure used to implement the remaining ways of the congruence class, the method further comprising:
- upon a memory access request, determining whether the access request results in a cache hit or a cache miss;
- in the event of a cache miss, determining whether the least recently used (LRU) way of the first type memory structure is also the LRU way of the entire congruence class, and in the event the LRU way of the first type memory structure is not the LRU way of the entire congruence class, then copying the contents of the LRU way of the first type memory structure into the LRU way of the entire congruence class, and
- further, in the event of a cache miss, filling the LRU way of the first type memory structure with a new cache line in accordance with the memory access request; and
- regardless of a cache hit or miss, updating LRU bits, depending upon the results of the memory access request.

20. The computer program product of claim 19, wherein the first type memory structure comprises static random access memory (SRAM) and the second type memory structure comprises dynamic random access memory (DRAM).

21. The computer program product of claim 20, wherein the method further comprises:
- upon a cache miss, determining whether the LRU way of the entire congruence class has been modified with respect to corresponding data in a higher level memory hierarchy; and
- casting out the LRU way to the higher level memory hierarchy in the event the LRU way of the entire congruence class has been modified, prior to filling the SRAM LRU way with the new cache line.

22. The computer program product of claim 21, wherein the method further comprises:
- in the event of a cache hit, determining whether the cache hit corresponds to an SRAM way; and
- in the event the cache hit does not correspond to an SRAM way, exchanging the SRAM LRU way with the hit way.

23. The computer program product of claim 19, wherein the first type memory structure comprises dynamic random access memory (DRAM) and the second type memory structure comprises nonvolatile memory.

24. The computer program product of claim 19, wherein the first type memory structure comprises refreshless dynamic random access memory (DRAM) and the second type memory structure comprises static random access memory (SRAM).

25. The computer program product of claim 24, wherein the DRAM comprises refreshless DRAM.

26. The computer program product of claim 19, wherein the first type memory structure comprises a hybrid way structure having at least one segment of static random access memory (SRAM) and remaining segments of dynamic random access memory (DRAM) within a single cache line, and the second type memory structure comprises DRAM.

27. The computer program product of claim 26, wherein a cache line segment containing data corresponding to the lowest addresses within the new cache line is copied to the SRAM segment of the hybrid way structure.

* * * * *